Nov. 16, 1926.  
W. G. MARTIN  
1,607,471  
DEVICE FOR COMPARISON OF FREQUENCY OF SOUNDS  
Filed April 3, 1923
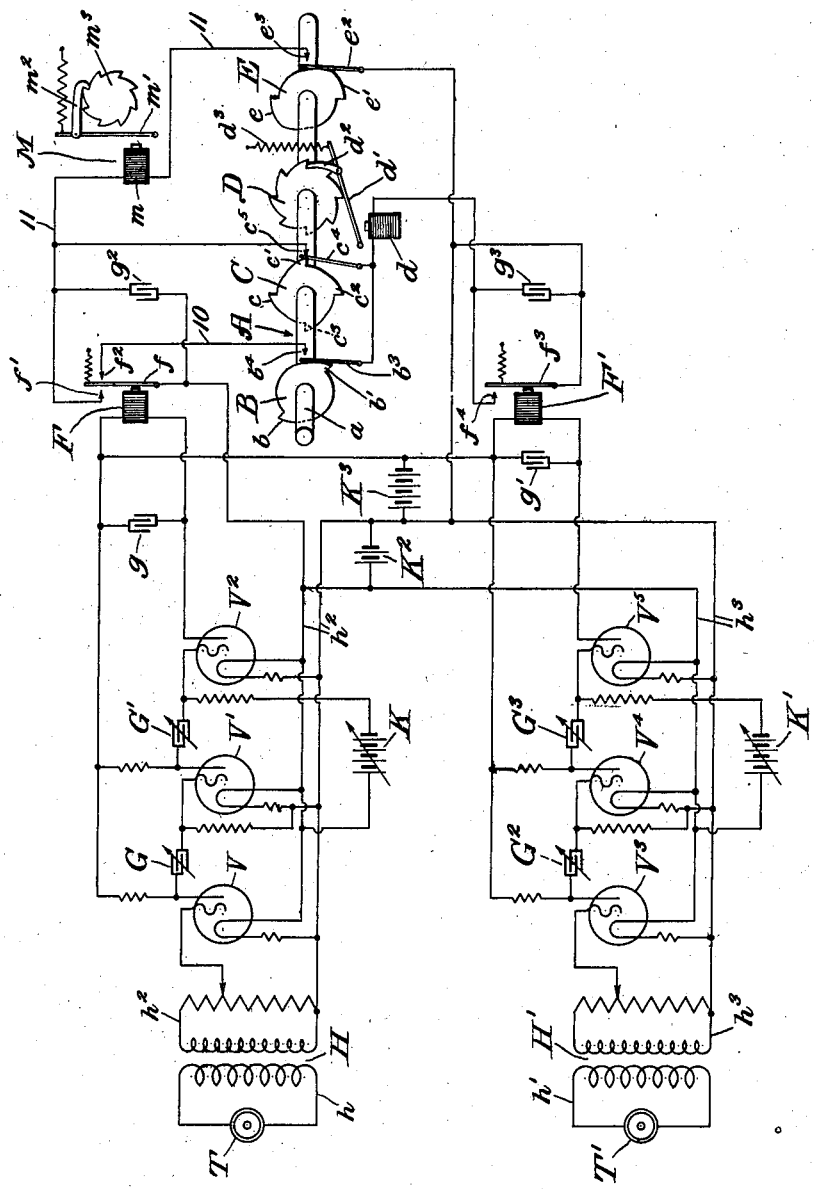
Inventor  
William G. Martin,  
By Wilkinson & Gusta  
Attorneys Patented Nov. 16, 1926.

1,607,471

UNITED STATES PATENT OFFICE.

WILLIAM G. MARTIN, OF PORTSMOUTH, VIRGINIA.

DEVICE FOR COMPARISON OF FREQUENCY OF SOUNDS.

Application filed April 3, 1923. Serial No. 629,671.

This invention relates to an apparatus for comparing the frequency of sounds emitted periodically from different sources, and has for its principal object the provision of an apparatus of this character which is particularly adapted for ascertaining the rate of movement of a watch, clock, or other similar device, more accurately, and in a much shorter period of time than is possible by the methods now commonly employed, i. e. by observation of either sight or sound.

All watches now manufactured make 300 beats per minute when adjusted to register standard time, and under the present methods of testing and adjusting above mentioned, it requires a run of at least 24 hours, and in some instances longer, in order to determine the rate of gain or loss of any particular time piece. It is furthermore extremely difficult to determine this gain or loss closer than one-half second in twenty-four hours, and while this is sufficiently accurate for some purposes, there are many other instances where greater accuracy is desirable.

The present invention, on the other hand, provides an apparatus which is comparatively simple in construction, relatively inexpensive to install, and quite efficient, whereby an accuracy approximating .4 seconds in twenty-four hours may be obtained by only a one minute run, and an accuracy of .019 seconds by a run of five minutes.

With the above and other objects in view which will appear as the description proceeds, the invention consists in the novel details of construction, combinations and arrangements of parts more fully hereinafter disclosed, and particularly pointed out in the appended claims.

Referring to the accompanying drawing forming a part of this specification in which the figure is a diagrammatic view illustrating an embodiment of the invention in the best form which I have so far devised, T and T' represent sensitive telephone transmitters of any approved type, which are included respectively in the primary circuits $h$ and $h'$ of the audio frequency transformers H and H'. The secondary circuits $h^2$ and $h^3$ of these transformers are suitably connected together substantially as shown, and include respectively the vacuum tubes V, V', $V^2$ and $V^3$, $V^4$, and $V^5$, which may be of the standard type commonly employed in radio telephonic work. K and K' represent variable batteries, designed to give approximately sixty-two volts, and connected as indicated in the circuits $h^2$ and $h^3$ respectively.

The said circuits also include a six-volt battery $K^2$ and a two-hundred-volt battery $K^3$, as well as a pair of relays F and F'. The said circuits also include variable condensers, G, G', $G^2$, and $G^3$, as well as the fixed condensers, $g$ and $g'$, and suitable resistance and impedance coils, substantially as shown, all as is well known in radio work.

The relay F is provided with an armature $f$ which is adapted to make contact alternately with the contact points $f'$ and $f^2$, while the relay F' is provided with an armature $f^3$, which is adapted to make contact when the magnet or relay is energized with the contact point $f^4$.

A indicates generally a mechanical device for making and breaking several electrical circuits which may be of any desired mechanical construction, and which is here shown diagrammatically as comprising a shaft $a$ upon which is mounted a plurality of discs B, C, D and E. The disc B is provided with a pair of substantially diametrically opposed teeth or cam surfaces $b$ and $b'$, while the disc C has four such projections, $c$, $c'$, $c^2$ and $c^3$.

The disc D preferably takes the form of a ratchet wheel, having eight teeth and constitutes the means for supplying power to the shaft $a$, which energy may be generated by means of an electro-magnet $d$ provided with an armature $d'$ having a pawl $d^2$ which engages the teeth of the ratchet wheel D, as will be readily understood. A suitable spring $d^3$ is connected to the said armature $d'$ and is adapted to move the latter in one direction against the action of the magnet $d$.

The disc E is provided with a pair of diametrically opposed cam surfaces, $e$ and $e'$, which surfaces are so designed as to cause the contact members hereinafter referred to, to remain in engagement for a period of time equivalent to the movement of the ratchet wheel D two steps.

The disc B has associated with it a movable contact member $b^3$ and a fixed contact member $b^4$, the latter of which is connected, as by a wire 10, with the contact member $f^2$. The disc C has associated with it a movable contact member $c^4$ and a fixed contact member $c^5$, while the disc E has a movable contact member $e^2$ and a fixed contact member $e^3$. The said contact member $e^3$ is connected by a wire 11 to the contact member $f'$ of the relay F, and the said wire includes a magnet $m$ of an electrical counting device M, which is also provided with an armature $m'$ having a pawl $m^2$ engaging with a suitable wheel $m^3$.

The various contacts are preferably connected together substantially as shown, and suitable fixed condensers $g^2$ and $g^3$ are associated with the relays F and F'.

The operation of the device is based upon the fact that two sources of sound which make emission periodically and at different frequency, are alternately in and out of synchronism, the time elapsing between successive points of synchronism or the duration of a cycle depending upon the difference in frequency of the two sound sources. If the frequency of one source is known, and the exact duration of a cycle is also known, the frequency of the other source may be readily ascertained.

As above stated, all watches now manufactured make three hundred beats per minute when adjusted to register standard time. If such a watch be placed in proximity to the transmitter T', the sounds emitted from the said watch would be transmitted through the various electrical apparatus and circuits to cause an energization of the magnet of the relay F' once for each beat of the watch.

If another watch which makes, say 301 beats per minute, be placed in proximity to the transmitter T, in like manner, the magnet of the relay F will be energized. However, due to the difference in the frequency, the relays F and F' will only be simultaneously operated once during each minute.

Assuming the parts to be in the positions illustrated and relays F and F' operating, it will be seen by tracing the circuit from the six-volt battery $K^2$ that the current will flow to the armature of relay F', and when the latter is closed to the contact $f^4$, thence through the magnet $d$, through the contacts $c^4$ and $c^5$ to the contact $f'$, when the relay F is simultaneously energized to its armature $f$, thence back to the battery. It will be noted, however, that this circuit is only complete when both of the relays F and F' are actuated simultaneously, and under the circumstances thus described, this can only happen once each minute. The closing of this circuit will energize the magnet $d$ momentarily, and through its armature $d'$, pawl $d^2$ and spring $d^3$, will impart movement of the ratchet wheel D, causing it to turn the shaft $a$ through one-eighth of a revolution. This movement of the shaft $a$ will, of course, carry with it the discs B, C and E, but will cause the above mentioned circuit to be broken at the contact points $c^4$ and $c^5$, due to the cam surface $c'$ disengaging the contact member $c^4$. It will, however, cause the cam surface $b'$ to force the contact member $b^3$ into engagement with the contact member $b^4$, thus closing the circuit across these contacts.

Disc E will also have closed its contact points, $e^2$ and $e^3$, as will be readily understood, and current from the battery $K^2$ will now flow through the said contacts $e^2$ and $e^3$ to the magnet $m$ of the counter M, and upon every energization of the magnet of the relay F to close its contacts $f$ and $f'$ back to the battery $k^2$. It will thus be apparent that so long as the circuit breaker A is in this position, the counter M will register each operation of the relay F.

It has been found, in practice, that when the relays F and F' close at the same time, to energize the magnet $d$, that if some provision is not made to prevent, they would operate this said magnet several times in succession. This difficulty is taken care of in the present instance, due to the fact that disc C has opened its circuit and disc B closed its circuit in the second position above mentioned, whereupon current from the battery will flow to the armature of relay F' across its contacts $f^3$ and $f^4$ when closed, to magnet $d$, to contacts $b^3$ and $b^4$ thence to the open contact $f^2$ of the relay F, and when this relay is open or de-energized, through its armature $f$ and back to the battery.

It will thus be seen that the watches must get completely out of synchronism before the magnet $d$ receives its second impulse, which impulse will move the ratchet wheel D, shaft $a$ and the discs B, C and E through another one-eighth revolution. This movement will again cause contacts $c^4$ and $c^5$ to be closed and will cause the contacts $b^3$ and $b^4$ to be opened while the contacts $e^2$ and $e^3$ remain closed. In this position the contacts of the discs B and C are in the same positions as they were initially, and like actions will follow as were first described, viz, the magnet $d$ will again receive an impulse as soon as relays F and F' close simultaneously. When this occurs the discs B, C and E are moved another eighth revolution to break all circuits, and no further action can take place until the ratchet mechanism or disc D is operated manually through one eighth revolution.

It will thus be seen that the counter M has counted the beats of the watch at the transmitter T between the point of synchronism and the same point one cycle later. Therefore, knowing the rate of the watch at the transmitter T' and having thus ascertained the rate of the watch at the transmitter T, it is a comparatively easy matter to ascertain the rate of gain or loss per twenty-four hours of the watch at the transmitter T.

It will thus be seen that by employing the present invention the rate of gain or loss of a watch may be easily ascertained within one minute, whereas by using the present methods of observation a run of at least twenty-four hours must be made in order to obtain the same accuracy. By adjustment of the watch at T to give, say 601 beats in two minutes, 901 beats in three minutes, etc., the accuracy can be very much increased, although the runs must necessarily increase to 2, 3, 4 or 5 minutes, as necessary.

These runs, however, are exceedingly short, as compared with the runs required by the present methods, and they will result in the accuracy of .1 second per day for two minutes, .05 seconds per day for three minutes, .026 seconds per day for four minutes and .019 seconds per day for five minutes. Furthermore, the circuits when adjusted, are very stable, and will remain so indefinitely.

It is obvious that those skilled in the art may vary the details of construction as well as the arrangement of parts without departing from the spirit of the invention, and therefore it is not wished to be limited to the above disclosure except as may be required by the accompanying claims.

What is claimed is:

1. An apparatus for comparing sound emissions of different frequencies from different sources, comprising sound energizing means for determining when the sound emissions from said sources are in synchronism, and means for counting the number of emissions from one source between two points of synchronism.

2. An apparatus for comparing sound emissions of different frequencies from different sources, comprising sound energizing means for determining when the sound emissions from said sources are in synchronism, and means for counting the number of emissions from one source between two points of synchronism, said last means being rendered operable at one point of synchronism, and inoperable at the succeeding point.

3. An apparatus for comparing sound emissions of different frequencies from different sources, comprising sound actuated means for automatically determining when the sound emissions from said sources are in synchronism, and means for counting the number of emissions from one source between two points of synchronism, said last means being automatically rendered operable at one point of synchronism, and inoperable at the succeeding point.

4. In an apparatus for comparing the frequencies of sound emissions from different sources, one of which frequencies is known, a pair of relays; sound actuated means associated with each of said relays to transmit thereto impulses corresponding to said sound emissions; and means for counting the actuations of one of said relays between two points of synchronism in their operations.

5. In an apparatus for comparing the frequencies of sound emissions from different sources, one of which frequencies is known, a pair of relays; sound energized means associated with each of said relays to transmit thereto impulses corresponding to said sound emissions; means for counting the actuations of one of said relays between two points of synchronism in their operations, and means for rendering said counting means operable at one point of synchronism and inoperable at another point of synchronism.

6. An apparatus for comparing the frequencies of sound emissions from different sources, one of which frequencies is known, comprising a pair of relays; sound energized means associated with each of said relays for transmitting thereto impulses corresponding to the sounds emitted by one of said sources; means for counting the operations of the relay responding to the sounds of unknown frequency; and means for rendering said counting means operative at one ponit of synchronism in the operation of said relays, and inoperative at another point of synchronism.

7. An apparatus for comparing the frequencies of sound emissions from different sources, one of which frequencies is known, comprising a pair of relays; sound actuated means associated with each of said relays for transmitting thereto impulses corresponding to the sounds emitted by one of said sources; electromechanical means for counting the operations of the relay responding to the sounds of unknown frequency; and means comprising a circuit maker and breaker controlled by said relays for rendering said counting means operative at one point of synchronism in the operation of said relays, and inoperative at another point of synchronism.

8. An apparatus for comparing the frequencies of sound emissions from different sources, one of which frequencies is known, comprising a pair of relays; radio telephonic means associated with each of said relays for transmitting thereto impulses corresponding to the sounds emitted by one of said sources; means for counting the operations of the relay responding to the sounds of unknown frequency; and means for rendering said counting means operative at one point of synchronism in the operation of said relays, and inoperative at another point of synchronism.

9. An apparatus for comparing the frequencies of sound emissions from different sources, one of which frequencies is known, comprising a pair of relays; radio telephonic means including a telephone transmitter, a frequency transformer and vacuum tubes associated with each of said relays for transmitting thereto impulses corresponding to the sounds emitted by one of said sources; means for counting the operations of the relay responding to the sounds of unknown frequency; and means for rendering said counting means operative at one point of synchronism in the operation of said relays, and inoperative at another point of synchronism.

WILLIAM G. MARTIN.